(12) United States Patent
Sprenger

(10) Patent No.: US 9,091,327 B2
(45) Date of Patent: Jul. 28, 2015

(54) DEVICE SYSTEM FOR A WIND TURBINE

(75) Inventor: Georg Sprenger, Alpen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 89 days.

(21) Appl. No.: 13/473,147

(22) Filed: May 16, 2012

(65) Prior Publication Data

US 2013/0130862 A1    May 23, 2013

(30) Foreign Application Priority Data

May 17, 2011 (DE) .......................... 10 2011 101 823
Aug. 31, 2011 (DE) .......................... 10 2011 081 861

(51) Int. Cl.
| | |
|---|---|
| F03D 11/00 | (2006.01) |
| F16H 1/28 | (2006.01) |
| F03D 11/02 | (2006.01) |
| F16H 1/46 | (2006.01) |

(52) U.S. Cl.
CPC .......... *F16H 1/28* (2013.01); *F03D 11/02* (2013.01); *F16H 1/46* (2013.01); *F05B 2240/61* (2013.01); *F05B 2260/40311* (2013.01); *Y02E 10/722* (2013.01)

(58) Field of Classification Search
CPC ........ H02K 5/225; H02K 7/003; F16D 1/033; F16D 1/076; F16D 3/227; F16D 11/12
See application file for complete search history.

(56) References Cited

U.S. PATENT DOCUMENTS

| | | | | |
|---|---|---|---|---|
| 2,695,371 | A * | 11/1954 | Barnes ........................ | 310/168 |
| 4,546,280 | A * | 10/1985 | Pfluger ...................... | 310/68 D |
| 7,946,819 | B2 * | 5/2011 | Hidding et al. ........... | 416/170 R |
| 2007/0284958 | A1 * | 12/2007 | Zacche' et al. ................. | 310/91 |
| 2010/0007151 | A1 | 1/2010 | Ciszak | |
| 2010/0029399 | A1 | 2/2010 | Gopfert | |
| 2010/0129222 | A1 | 5/2010 | Hidding et al. | |
| 2010/0133854 | A1 | 6/2010 | Jansen et al. | |
| 2010/0329867 | A1 | 12/2010 | Patel et al. | |
| 2011/0068583 | A1 | 3/2011 | Burkart | |
| 2011/0133469 | A1 * | 6/2011 | Jansen et al. .................... | 290/55 |
| 2012/0035014 | A1 * | 2/2012 | Moeller ........................... | 475/5 |
| 2012/0237290 | A1 * | 9/2012 | Kozlowski et al. .......... | 403/337 |

FOREIGN PATENT DOCUMENTS

| | | |
|---|---|---|
| DE | 102007012408 A1 | 9/2008 |
| DE | 102007056487 A1 | 5/2009 |
| DE | 102009013566 A1 | 9/2010 |
| EP | 1045139 A2 | 10/2000 |
| EP | 1508692 A1 | 2/2005 |
| EP | 1593867 A1 | 11/2005 |
| EP | 1884672 A2 | 2/2008 |
| EP | 1328735 B1 | 1/2010 |
| EP | 2273112 A2 | 1/2011 |

* cited by examiner

Primary Examiner — Robert Hodge
Assistant Examiner — Ryan Dodd
(74) Attorney, Agent, or Firm — Henry M. Feiereisen LLC

(57) ABSTRACT

A drive system for a wind turbine includes at least one planetary gear stage, connectable to a rotor shaft of the wind turbine and including a sun gear engaging with multiple planetary gears, a driven hollow shaft connected to the sun gear, a pitch tube having a generator-side end with a centering shoulder, and a face side provided with threaded holes, the pitch tube being arranged concentrically to the annulus gear and extending axially over the entirety of the planetary stage, an adapter element having an opening for receiving a generator add-on component, the adapter element being received on and radially surrounding the generator side end and fixed in position radially and axially in one direction by the centering shoulder, and screw-type connection fittings extending axially through the adapter element and being received in the threaded holes of the pitch tube for securing the adapter element to the pitch tube.

4 Claims, 2 Drawing Sheets

DEVICE SYSTEM FOR A WIND TURBINE

CROSS-REFERENCES TO RELATED APPLICATIONS

This application claims the priorities of German Patent Applications, Serial Nos. DE 10 2011 101 823.2, filed May 17, 2011, and DE 10 2011 081 861.8, filed Aug. 31, 2011, pursuant to 35 U.S.C. 119(a)-(d), the contents of which are incorporated herein by reference in its entirety as if fully set forth herein.

BACKGROUND OF THE INVENTION

The present invention relates to a drive system for a wind turbine.

The following discussion of related art is provided to assist the reader in understanding the advantages of the invention, and is not to be construed as an admission that this related art is prior art to this invention.

A drive train of a wind turbine essentially comprises system components such as power grid connection elements, generators, clutches, gearboxes and rotor shafts. Inverters are frequently provided on the power grid side. Brakes are often provided in the form of mechanical brakes on fast-running shafts between gearbox and generator, since braking torques are smaller at that point for reasons due to transmission ratio.

Vastly different requirements dependent on the individual case exist in wind turbine plants with regard to a connection of a pitch tube on the gearbox side to add-on components specified by a system manufacturer or plant operator, in particular slip ring units. This makes it difficult to use standardized pitch tubes for selected gearbox sizes and therefore leads to increased costs.

It would therefore be desirable and advantageous to provide a drive system for a wind turbine, wherein at least one gear stage of the drive system can be easily connected to a multiplicity of different sized generators.

SUMMARY OF THE INVENTION

According to one aspect of the present invention, a drive system for a wind turbine, can include at least one planetary gear stage, connectable to a rotor shaft of the wind turbine via a clutch, said planetary gear stage including an annulus gear, a planetary carrier, a plurality of planetary gears mounted in the planetary carrier and engaging with the annulus gear, and a sun gear engaging with the planetary gears, a driven hollow shaft connected to the sun gear, a pitch tube constructed as a hollow shaft and having a generator-side end which has a centering shoulder formed by a change of a wall thickness of the pitch tube, and a face side provided with threaded holes, wherein the pitch tube can be in concentric relationship with the annulus gear and extend axially over the entirety of the planetary gear stage, an adapter element having an opening for receiving a generator add-on component, the adapter element being received on the generator-side end and in surrounding relationship therewith and fixed in position radially and axially in one direction by the centering shoulder, and a plurality of screw-type connection fittings extending axially through the adapter element and being received in the threaded holes of the pitch tube for securing the adapter element to the pitch tube.

The inventive use of the adapter element permits the use of pitch tubes having a significantly smaller outside diameter than in conventional prior art solutions. This means that more compact gearboxes can be designed. Furthermore it is possible with the present invention to use a uniform pitch tube for a plurality of sizes of gearbox. By means of different adapter implementations allowance can be made for individual requirements of system builders or plant operators with regard to connection dimensions on the system or generator side.

According to another advantageous feature of the invention, the centering shoulder can be formed by an annular external recess on the pitch tube.

According to another advantageous feature of the invention, the centering shoulder can be formed an annular internal recess on the pitch tube. This can be useful for example in order to connect the pitch tube to generator add-on components having a relatively small diameter.

According to another advantageous feature of the invention, the adapter element can have an annular extension, wherein the annular extension can bear against the face side and have axially extending through-holes for receiving the screw-type connection fittings. This enables a larger diameter to be chosen for the opening on the adapter element for receiving corresponding generator add-on components.

According to another advantageous feature of the invention, the at least one planetary gear stage can include a main bearing constructed as a bearing for the rotor shaft of the wind turbine. This allows for a particularly compact design of the at least one planetary gear stage. Two planetary gear stages are preferably provided in this arrangement. In this case the main bearing is associated with a first planetary gear stage on the rotor side.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
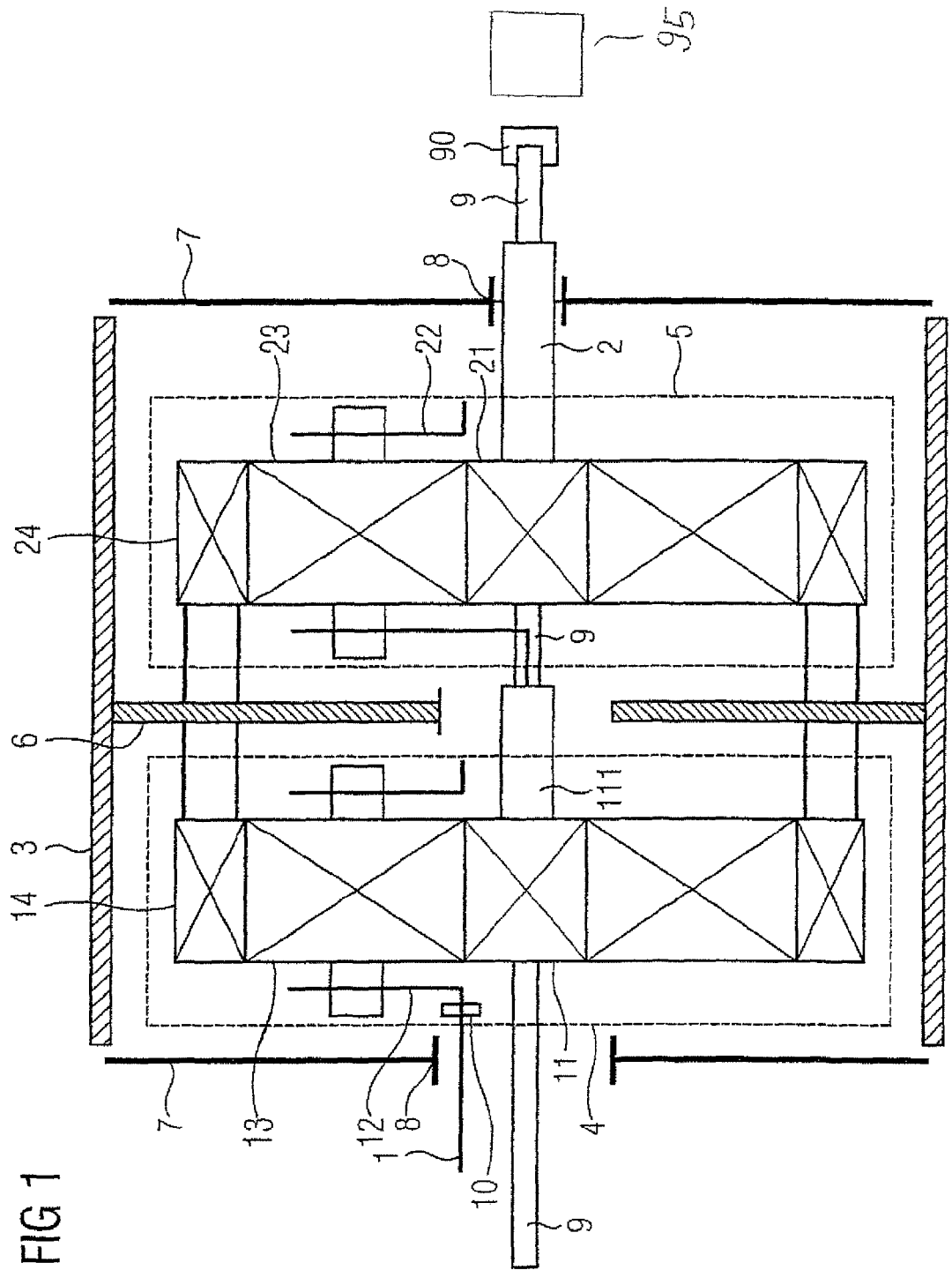
FIG. 1 shows a schematic view of a drive system for a wind turbine.

Throughout all the Figures, same or corresponding elements may generally be indicated by same reference numerals. These depicted embodiments are to be understood as illustrative of the invention and not as limiting in any way. It should also be understood that the Figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a drive system for a wind turbine, which drive system comprises a gearbox having two planetary gear stages 4, 5. In this arrangement a first planetary gear stage 4 on the rotor side has a planetary carrier 12 coupled to a rotor shaft 1 by way of a clutch 10. The planetary carrier 12 is mounted for example by means of roller bearings which form a main bearing of the gearbox in a gearbox casing 3 enclosing the two planetary gear stages 4, 5 and closed off on the face side by means of a casing cover 7 in each case. The main bearing of the gearbox in this case also forms bearings for the rotor shaft 1 of the wind turbine.

Mounted in the planetary carrier 12 of the first planetary gear stage 4 are a plurality of planetary gears 13 which are engaged with a stationary annulus gear 14 of the first planetary gear stage 4. In addition the planetary gears 13 are engaged with a sun gear 11 of the first planetary gear stage 4, the sun gear shaft 111 of which is coupled in a rotationally fixed manner to a planetary carrier 22 of a second planetary gear stage 5 on the side of generator 95. A plurality of planetary gears 23 are mounted in the planetary carrier 22 of the second planetary gear stage 5 and are engaged on one side with a stationary annulus gear 24 and on the other side with a sun gear 21 of the second planetary gear stage 5. A driven shaft 2 of the gearbox is coupled to the sun gear 21 of the second planetary stage 5. The driven shaft 2, like the sun gear shaft 111 of the first planetary gear stage 4, is embodied as a hollow shaft. Arranged concentrically with the driven shaft 2 and the sun gear shaft 111 of the first planetary gear stage 4 is a pitch tube 9, likewise embodied as a hollow shaft, which extends axially over the entire drive system. The casing covers 7 additionally have openings 8 for the rotor shaft 1 and the driven shaft 2.

Arranged in an internal chamber of the gearbox casing 3 is a partition wall 6 by means of which the internal chamber is subdivided into two sub-chambers, in each of which is disposed a planetary stage 4, 5. The partition wall 6 has an opening through which the sun gear shaft 111 of the first planetary gear stage 4 is routed. The annulus gears 14, 24 of the planetary stages 4, 5 are also secured to the partition wall 6, a face side of an annulus gear 14, 24 bearing against the partition wall 6 in each case. Basically, the annulus gears 14, 24 can also form parts of the gearbox casing 3 or be integrated into said casing.

An adapter element 90 for connecting the pitch tube 9 to a generator add-on component is connected to the pitch tube 9. In the present exemplary embodiment the generator add-on component is a slip ring unit. The adapter element 90 is illustrated in detail in FIG. 2. At its generator-side end the pitch tube 9 has a centering means for the adapter element 90 in the form of a centering shoulder 911 created by means of a sudden change in wall thickness. The adapter element 90 radially encloses the pitch tube 9 at its generator-side end and is fixed in position radially as well as axially on one side by means of the centering shoulder 911. The centering shoulder 911 is formed for example by means of an annular external recess on the pitch tube 9. According to an alternative embodiment variant the centering shoulder 911 could in principle also be formed by means of an annular internal recess on the pitch tube 9. This can be useful for example in order to connect the pitch tube 9 to generator add-on components having a relatively small diameter.

A plurality of screw-type connection fittings 91 which are introduced into face-side threaded holes 912 at the generator-side end of the pitch tube 9 and by means of which the adapter element 90 is secured to the pitch tube 9 extend through axial through-holes 93 in the adapter element 90. An opening 92 for receiving a connecting piece of a generator add-on component is also provided on the adapter element 90, the opening 92 being tailored in terms of its diameter to a generator add-on component that is to be connected.

Figure 2:
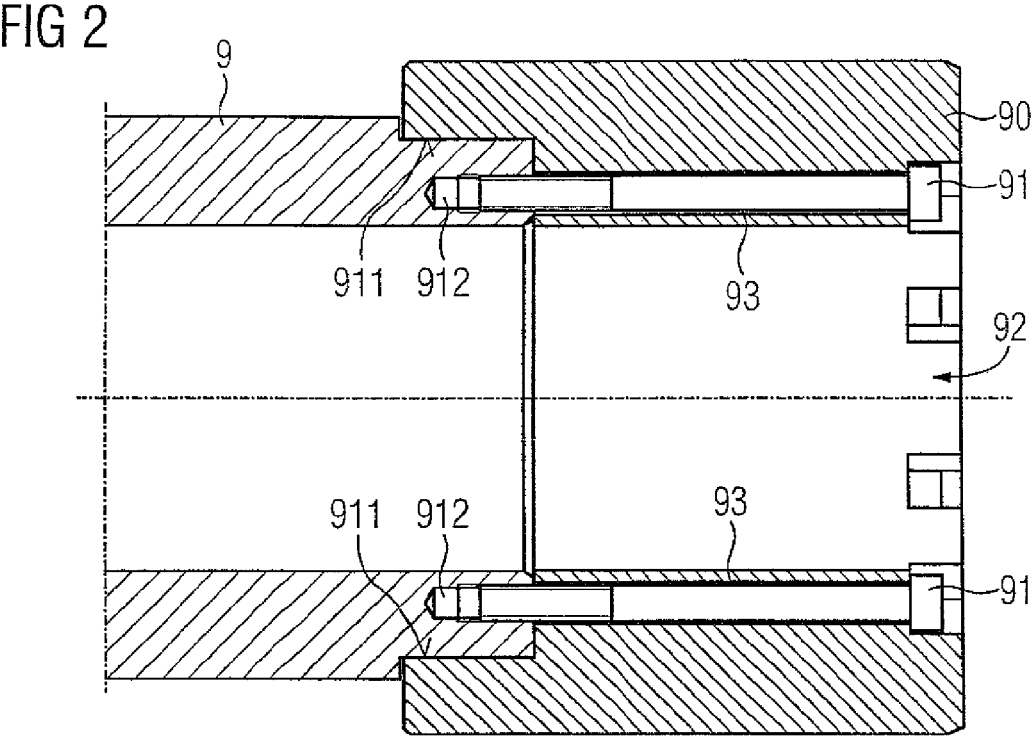
FIG. 2 shows an adapter element for a drive system according to FIG. 1.
Figure 3:
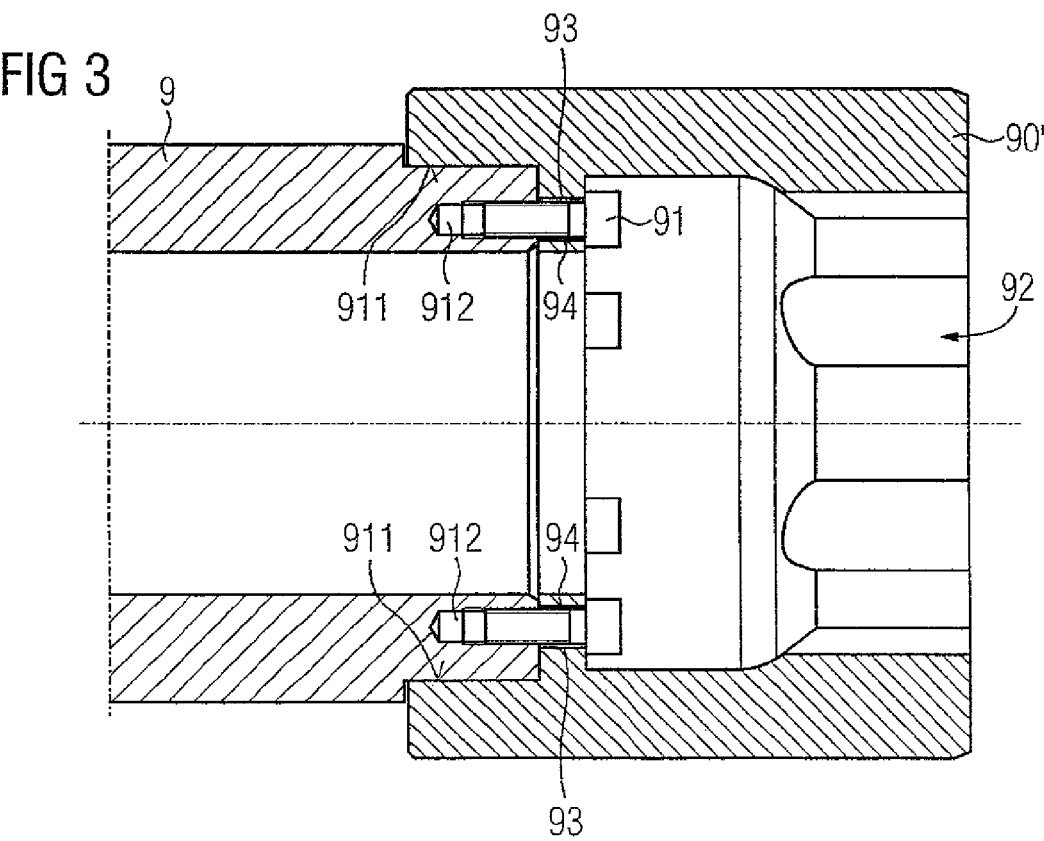
FIG. 3 shows an adapter element that has been modified in comparison with FIG. 2 for a drive system according to FIG. 1.

The adapter element 90' shown in FIG. 3 is different from the adapter element 90 according to FIG. 2 in that an annular extension 94 bearing on the face side against the generator-side end of the pitch tube 9 is provided with axially extending through-holes 93 for the screw-type connection fittings 91. This permits a greater diameter of the opening 92 on the adapter element 90' to be chosen for receiving corresponding generator add-on components.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A drive system for a wind turbine, said drive system comprising:
    at least one planetary gear stage, connectable to a rotor shaft of the wind turbine via a clutch, said planetary gear stage comprising an annulus gear, a planetary carrier, a plurality of planetary gears mounted in the planetary carrier and engaging with the annulus gear, and a sun gear engaging with the planetary gears;
    a driven hollow shaft connected to the sun gear;
    a pitch tube constructed as a hollow shaft and having a generator-side end, said generator-side end having a centering shoulder formed by an abrupt change of a wall thickness of the pitch tube, and a face side provided with threaded holes, said pitch tube being in concentric relationship with the annulus gear and extending axially across the entirety of the planetary gear stage;
    an adapter element having an opening for receiving a generator add-on component, said adapter element being received on and in surrounding relationship with said generator-side end and fixed in position radially and axially in one direction by the centering shoulder, said adapter element having an annular extension projecting from an inside of the adapter element said annular extension bearing against an end side of the shoulder in an axial direction of the adapter element and having axially extending through-holes for receiving the screw-type connection fittings; and
    a plurality of screw-type connection fittings extending axially through the adapter element and being received in the threaded holes of the pitch tube for securing the adapter element to the pitch tube.

2. The drive system of claim 1, wherein the centering shoulder is formed by an annular external recess on the pitch tube.

3. The drive system of claim 1, wherein the at least one planetary gear stage further comprises a main bearing constructed as a bearing for the rotor shaft of the wind turbine.

4. The drive system of claim 3, further comprising two of said at least one planetary gear stage, wherein the main bearing is associated with a rotor-side one of the two planetary gear stages.

* * * * *